United States Patent Office 3,348,955
Patented Oct. 24, 1967

3,348,955
PROCESS FOR STABILIZING STERILIZED MILK
Aubrey P. Stewart, Jr., Corning, Iowa, assignor to Nodaway Valley Foods, Inc., a corporation of Iowa
No Drawing. Filed Sept. 14, 1966, Ser. No. 579,212
2 Claims. (Cl. 99—151)

ABSTRACT OF THE DISCLOSURE

The method for stabilizing short-time high-temperature sterilized evaporated milk against age-thickening which comprises, adding to the cooled sterile milk a polyphosphate of the class consisting of sodium, potassium, and ammonium polyphosphates sterilized in the absence of heat in the proportion of from .02 percent to .10 percent by weight of the milk solids.

---

This application is a continuation-in-part of my copending application Ser. No. 377,090, filed June 22, 1964, now abandoned, and assigned to the assignee of this invention.

This invention relates to a process for stabilizing sterilized concentrated milk and milk products against age thickening.

For a considerable period of time there has existed a definite need and market for a high-temperature, short-time sterilized concentrated milk capable of being asceptically canned. While the techniques for effecting the sterilization in aseptic canning are available, a problem which has plagued producers of the product is the tendency of the concentrated milk to become thickened or gelatinous upon prolonged storage. In my Patent No. 3,008,840 there is described a method for preventing gelation of sterilized, aseptically canned, concentrated milk which, very broadly speaking, comprises adjustment of the salt balance of the product by increasing the reactive divalent to monovalent ion ratio of the product prior to aseptic canning but subsequent to the sterilization step. It is important that the increase in reactive divalent cation be effected only after sterilization, as a high divalent to monovalent ion ratio existing prior to sterilization tends to destabilize the milk when it is subjected to a subsequent heating step. In fact, to stabilize the milk against the deleterious effects of the sterilization heat, it is preferable that the concentration of reactive divalent cations be decreased prior to sterilization. All of the foregoing is more fully set forth in my Patent 3,008,840 hereinbefore referred to.

Subsequent to the issue of my patent, publications by the University of Wisconsin and the United States Department of Agriculture indicated that the addition of sodium polyphosphate to concentrated milk prior to sterilization is effective in delaying gelation of the concentrated milk upon storage. While the publications did not indicate the precise chemical reaction which took place, it is conceivable that the addition of polyphosphates inactivate the divalent ions during sterilization and thereby produce a final sterilized product which is higher in ionic calcium (or calcium loosely combined or complexed with milk protein) than if polyphosphates were not used. Thus it may be that the effect of the polyphosphates is to decrease the active divalent ion ratio prior to sterilization and increase the same after sterilization. This, then, would appear to be another method of practicing the process of my said patent.

As far as is understood, the results of the addition of polyphosphates by the Department of Agriculture and by the University of Wisconsin have not been consistent. For example, the Department of Agriculture workers report that the addition of polyphosphate is also helpful to stabilize milk concentrate against heat coagulation of proteins during high-temperature, short-time sterilization, whereas the University of Wisconsin workers have reported experiments wherein there is either no effect or a detrimental effect on the stabilization of proteins by the addition of polyphosphates.

The polyphosphates used in the experiments described have been, actually, mixtures of the various forms of sodium phosphates, including ortho, pyro, tripoly, trimeta, hexameta and further higher molecular chain lengths. The average chain lengths of the sodium polyphosphates most frequently used in the studies at the University of Wisconsin and the Department of Agriculture have been in the range of 5 to 14.

The addition of sodium orthophosphate to concentrated milk prior to sterilization will stabilize the concentrate against heat coagulation of the milk protein. Presence of sodium orthophosphate, however, increases the rate of gelation of the product after high-temperature, short- time sterilization and aseptic canning. The addition of polyphosphates prior to sterilization may cause a similar result because under the processing conditions used in high-temperature, short-time sterilization of milk, substantial and significant hydrolysis of polyphosphates can and does occur. This then is an explanation of the inconsistent results obtained in the use of polyphosphates added to concentrated milk prior to sterilization and also of the fact that relatively high quantities of polyphosphates are required to prevent gelation. The degree of such hydrolysis may also explain, or be related to the typical orthophosphate stabilizing effect on milk proteins during heat sterilization.

The addition of high-temperature, short-time sterilized sodium polyphosphate into previously sterilized concentrated milk just prior to aseptic canning has little, if any, inhibiting effect against gelation and, in fact, may slightly increase the rate of gelation. This result I believe is due to the hydrolysis of the sodium polyphosphate occurring during the heat sterilization of the polyphosphate solution.

The desire is, in effect, to render calcium ions inactive or unreactive during sterilization so as to inhibit the tendency thereof to cause coagulation or precipitation of the protein in the milk. After sterilization and cooling, it is desired that calcium ions become available as their presence inhibits gelation and, in fact, if additional calcium ions become available in the aseptically canned product during storage gelation will be inhibited for even longer periods. I find that I can accomplish the foregoing result by adding polyphosphates, for example, sodium polyphosphate, potassium polyphosphate, and ammonium polyphosphate before sterilization.

During the sterilization process the polyphosphate combines with the calcium ions and renders it inactive or unreactive, thus inhibiting the coagulating tendency of the calcium ions during the sterilization process. After sterilization the polyphosphate hydrolyzes up to where 80 or 90 percent of the polyphosphate is hydrolyzed. The hydrolysis releases or activates calcium ions and forms pyrophosphates and orthophosphates. While it is true that pyro and ortho phosphates tend to cause gelation, the calcium ions released during the hydrolysis exhibit an anti-gelation tenlency which overcomes or offsets the gelation tendency of the ortho and pyro phosphates.

The foregoing polyphosphates (potassium, sodium and ammonium) can be separately sterilized (in the absence of heat) and added to the cool sterilized milk. When added, the polyphosphates combine with a portion of the calcium ions immediately upon introduction, leaving sufficient calcium ions to inhibit gelation. In storage, the polyphosphates slowly hydrolyze thus providing a source of release of activated calcium ions to continue the anti-gelation effect thereof over a substantial period.

Where polyphosphates are added before sterilization the quantity should be from .30 to 1.0 percent by weight of milk solids. Where the polyphosphates are added after sterilization, the percentage should be from .02 to .10 percent by weight of milk solids.

When the polyphosphates are to be added after sterilization, a polyphosphate solution is sterilized while cold utilizing ultrafiltration to filter out septic elements. I then added the sterile solution into high-temperature, short-time sterilized, cooled, concentrated milk just prior to aseptic canning. I found this procedure to be extremely effective in delaying gelation and the process required the use of considerably lesser amounts of polyphosphate in the milk as compared with the levels required when added to concentrated milk prior to sterilization.

As noted above, substantially less polyphosphate is required if cold sterilized polyphosphate is added after the milk has been sterilized and cooled. As a matter of fact, if the same amount of polyphosphate were added to the cold sterilized milk as is required when the polyphosphate solution is added to the milk prior to sterilization, gelation of the product would be accelerated, as the excess polyphosphate would combine with or inactivate substantially all of the calcium ions, the presence of which in the final product inhibits gelation. This inactivation of the gelation-inhibiting calcium ions would result in rapid gelation of the product. If one follows the teachings, for example in the Leviton et al. patent No. 3,119,702, and utilizes the same amount of polyphosphate either before or after sterilization, the results would be quite different in each case. Thus if one added sufficient polyphosphates before sterilization, adding the same amount after sterilization would accelerate gelation. On the other hand, if one added only the smaller amount used after sterilization but added such smaller amount prior to sterilization, protein precipitation would occur during the sterilization process and the product would be unusable.

I claim:
1. The method for stabilizing short-time high-temperature sterilized evaporated milk against age-thickening which comprises, cooling the sterilized evaporated milk, sterilizing in the absence of heat a polyphosphate of the class consisting of sodium, potassium and ammonium polyphosphates, adding to the cooled sterile milk said polyphosphate in the proportion of from .02 percent to .10 percent by weight of the milk solids.

2. The method for stabilizing short-time high-temperature sterilized evaporated milk against age-thickening which comprises, cooling the sterilized milk in the absence of heat passing a polyphosphate solution chosen from the class consisting of sodium, potassium and ammonium polyphosphates through a filter sufficiently fine to remove septic media therefrom, and adding the filtered polyphosphate solution to the cooled sterile milk in an amount equal to from .02 percent to .10 percent of polyphosphate by weight of the milk solids.

References Cited

UNITED STATES PATENTS 3,119,702   1/1964   Leviton et al. _____ 99—151 X

FOREIGN PATENTS 857,700   1/1964   Great Britain.

OTHER REFERENCES

Journal of Dairy Science, vol. XLV, No. 9, September 1962, pp. 1045–1056, Sf 221, J 8.

Journal of Dairy Science, vol. XLVI, No. 4, April 1963 pp. 310–319, Sf 221, J 8.

XVI International Dairy Congress, Copenhagen, 1962 Section V:2, pp. 1009–1018.

A. LOUIS MONACELL, *Primary Examiner.*

RAYMOND N. JONES, *Examiner.*

S. E. HEYMAN, *Assistant Examiner.*